United States Patent [19]
Highnote et al.

[11] Patent Number: 5,680,811
[45] Date of Patent: Oct. 28, 1997

[54] RECIRCULATING FOOD PRODUCT FRYER

[75] Inventors: David Highnote, Lithia Springs, Ga.; Kevin Buller, Englewood, Ohio

[73] Assignee: Premark FEG L.L.C., Wilmington, Del.

[21] Appl. No.: 685,190

[22] Filed: Jul. 18, 1996

[51] Int. Cl.⁶ .................................................. A47J 37/12
[52] U.S. Cl. .......................... 99/408; 99/403; 210/167; 210/DIG. 8; 415/208.1
[58] Field of Search .............................. 99/403, 408, 409, 99/407, 404, 405, 406; 210/765, 167, DIG. 8; 415/208.1

[56] References Cited

U.S. PATENT DOCUMENTS

| | | | |
|---|---|---|---|
| 2,778,614 | 1/1957 | Koch | 415/208.1 X |
| 3,318,252 | 5/1967 | Nichols | 415/208.1 X |
| 4,487,691 | 12/1984 | Panora | 210/167 |
| 4,578,196 | 3/1986 | Friedman | 99/403 X |
| 4,623,544 | 11/1986 | Highnote | 426/233 |
| 4,704,290 | 11/1987 | Fritzsche | 426/99 |
| 4,781,172 | 11/1988 | Byrd et al. | 126/99 |
| 4,882,984 | 11/1989 | Eves, II | 99/404 |
| 5,404,799 | 4/1995 | Bivens | 99/408 |

Primary Examiner—Reginald L. Alexander
Attorney, Agent, or Firm—Thompson Hine & Flory LLP

[57] ABSTRACT

A recirculating food product deep fryer comprising a cooking tank, a cooking oil dispersement assembly extending into the cooing tank for emitting a cooking oil into the cooking tank, a heat exchanger, and a centrifugal pump for continuously pumping the cooking oil through the heat exchanger and cooking tank. The centrifugal pump includes a cylindrical, hollow and vertically aligned sump tube and a pump impeller rotatably mounted approximate the bottom end of the sump tube, a rotor shaft extending through the sump tube substantially along the sump tube axis for rotatably driving the impeller, a motor couple to the rotor shaft at the top end of the sump tube for rotatably driving the rotor shaft, and an annular baffle mounted to the rotor shaft between the pump impeller and the motor. The annular baffle acts to centrifugally sling cooking oil particles entrained in steam rising vertically through the sump tube and coming in contact with the bottom surface of the annular baffle. The cooking oil particles contacting the bottom surface of the annular baffle are caused to impinge against the inner surface of the sump tube such that they gather on the inner surface of the sump tube and drip downwardly towards the impeller.

33 Claims, 4 Drawing Sheets

RECIRCULATING FOOD PRODUCT FRYER

BACKGROUND

The present invention pertains to a recirculating, continuous-filtering deep fryer used for cooking various types of food products within a heated bath of cooking oil; and more particularly, to a recirculating deep fryer in which the overall efficiency, reliability and performance of the fryer have been significantly improved.

A typical recirculating, continuous-filtering deep fryer will comprise a cooking tank containing a heated bath of cooking oil. The cooking tank is adapted to receive baskets of food products such that the food products will be immersed within and cooked by the heated cooking oil. Such recirculating type fryers also comprise a heat exchanger and a pump. The pump is responsible for continuously pumping the cooking oil from the cooking tank, through the heat exchanger, and back into the cooking tank such that the cooking oil remains at a substantially constant temperature, thereby allowing the food product to be evenly and consistently cooked within the cooking tank.

A typical pump for use with such recirculating, continuous filtering fryers is a stand-pipe centrifugal pump. The stand-pipe pump includes a cylindrical, hollow and vertically-aligned sump tube, a pump impeller rotatably mounted in an impeller housing at the bottom end of the sump tube, a rotor shaft extending through the sump tube and coupled to the hub of the impeller, an inlet in fluid communication with an outlet tube of the cooking tank, an outlet in fluid communication with an inlet to the heat exchanger, and a motor coupled to the rotor shaft approximate the top end of the sump tube for rotatably driving the rotor shaft and in turn the impeller.

It is not uncommon for a frozen food product, which is to be cooked by the fryer, to contain a significant amount of water or other types of hydrophilic fluids; and once this food product is immersed in the heated cooking oil bath, much of the water is released from the food product and retained within the hydrophobic cooking oil. Of course, the water is never absorbed into the cooking oil, and as often occurs, much of this retained water will escape from the cooking oil by rising through the sump tube of the stand-pipe pump in the form of steam.

A significant problem concerning this escape of steam through the sump tube is that cooking oil particles entrained in the steam become deposited within the motor as the steam rises to the level of the motor. This can cause significant problems to the motor, i.e., diluting the bearing grease of the motor. One attempt to address this problem entailed mounting a fixed plate between the motor and the sump tube to cut off the motor from the sump tube, and providing only enough clearance for the rotor shaft to extend therethrough. However, in operation, the fixed plate proved insufficient in that cooking oil was eventually forced through the apertures between the rotor shaft and the fixed plate by the pressure of the rising steam. Accordingly, a need exists for a means or apparatus which prohibits or substantially reduces the amount of cooking oil deposited into the motor of the stand-pipe pump caused by the rising steam.

Another problem with the stand-pipe type centrifugal pump is that the cooking oil within the pump, and in particular within the sump tube, will tend to form a vortex within the sump tube as the impeller rotates during normal operation of the pump. Such a vortex within the sump tube tends to draw substantial amounts of air down into the pump and cooking oil; and thus, causes the cooking oil to become aerated to an undesirable extent. Aeration of the cooking oil in such manner is undesirable because aeration of the cooking oil decreases the efficiency of the heat exchange process and significantly decreases the life of the cooking oil. Accordingly, a need exists for a means to substantially prohibit the formation of a vortex in the cooking oil present within the sump tube of the stand-pipe pump.

Another problem encountered with the conventional stand-pipe centrifugal pump is that the impeller bearing, which extends from the bottom surface of the impeller and which is received by and journaled within an impeller bearing sleeve positioned in a bottom stator plate in the impeller casing, often becomes clogged with food waste and other types of food by-product. Depending upon the type of food being cooked, this resulting food by-product can become heavy and can cause the pump to become significantly impaired or even cause the pump to seize, and thereby disabling the pump entirely. Accordingly, a need exists for an improvement to the stand-pipe pump which reduces the susceptibility of the impeller bearing components being clogged with food by-product during normal operation of the pump.

Conventional recirculating fryers may also include a cooking oil dispersement tube assembly positioned within the cooking tank for disbursing the heated cooking oil received from the heat exchanger back into the cooking tank. In one known dispersement tube assembly design, the dispersement tubes contain a plurality of orifices spaced longitudinally along the dispersement tubes which point downwardly, such that the cooking oil is ejected from the dispersement tubes downward towards the floor of the cooking tank. A disadvantage with this type of dispersement tube assembly design is that food particles are not able to settle to the bottom of the cooking tank because of the turbulence caused in the bottom of the tank by the downward pointing dispersement tubes. Accordingly, a need exists for a dispersement tube assembly with an improved design providing adequate circulation of the cooking oil within the cooking tank, while allowing food by-product particles to settle at the bottom of the cooking tank.

Finally, conventional recirculating fryers include racks releasably mounted in the cooking tank, above the dispersement assembly, for supporting the frying baskets in the cooking tank; and also include a screen releasably mounted in the cooking tank, and substantially covering the outlet tube opening of the cooking tank, for prohibiting the larger food by-product particles from entering into the pump and disturbing the performance of the pump. It has been observed that often times the operator will mount the support rack into the cooking tank without mounting the screen. Therefore, when the fryer is operated without the screen mounted in the cooking tank, larger food by-product particles will be allowed to enter into the pumping system and will often-times degrade the performance of the fryer, and possibly damage the fryer components. Accordingly, a need exists for a means to ensure that the cooking tank outlet screen is properly installed during operation of the fryer.

SUMMARY

The present invention pertains to a recirculating food-product deep fryer comprising a cooking tank, a cooking oil dispersement assembly extending into the cooking tank for emitting cooking oil into the cooking tank, an outlet tube in fluid communication with the cooking tank interior and having an opening into the tank interior, a heat exchanger having an outlet in fluid communication with the dispersement assembly, and a centrifugal pump for continuously pumping the cooking oil through the heat exchanger and cooking tank, having a pump inlet in fluid communication with the outlet tube of the cooking tank and a pump outlet in fluid communication with an inlet to the heat exchanger.

The centrifugal pump is a stand-pipe variety pump having a cylindrical, hollow and vertically-aligned sump tube, a pump impeller rotatably mounted approximate the bottom end of the sump tube, a rotor shaft extending through the sump tube substantially along the sump tube axis and coupled to the hub of the impeller for rotatably driving the pump impeller, a motor coupled to the rotor shaft approximate to the top end of the sump tube for rotatably driving the rotor shaft, and an annular baffle mounted to the rotor shaft between the pump impeller and the motor which acts to centrifugally sling cooking oil particles entrained in steam rising vertically through the sump tube and coming in contact with the bottom surface of the annular baffle. The cooking oil particles contacting the bottom surface of the annular baffle are caused to impinge against the inner surface of the sump tube, such that they gather on the inner surface of the sump tube and drip downwardly towards the bottom end of the sump tube.

Preferably the annular baffle is a frustoconically shaped annular plate with a diameter which is slightly smaller than the diameter of the inner surface of the sump tube. Furthermore, the annular baffle plate is preferably vertically positioned along the rotor shaft closer to the motor than to the impeller such that the annular baffle plate remains above the normal level of cooking oil in the sump tube.

The present invention also includes a vertically-aligned second baffle plate mounted to the inner surface of the sump tube, between the annular baffle plate and the impeller, and extending radially inward towards the rotor shaft. This vertical baffle plate is provided to substantially prevent the formation of a vortex in the cooking oil present within the sump tube during the operation of the pump. This vertical baffle plate preferably extends vertically from the impeller to a point approximately equal to the level of the cooking oil within the sump tube; and the centrifugal pump preferably includes two of these vertical baffle plates, circumferentially arranged along the inner surface of the sump tube.

The present invention also includes a cylindrical bearing extending from the top surface of the impeller which is journaled by an annular sleeve bearing mounted to the inner surface of the sump tube, at the bottom of the sump tube. This top-mounted bearing assembly significantly reduces the amount of food by-product which is caught by and which subsequently clogs the bearing assembly of the impeller.

The present invention also includes an impeller housing which has a floor shaped with a slight concavity such that a reservoir is formed under the impeller for collecting water entrained in the cooking oil. Preferably, the impeller housing also includes a valve or drain, in fluid communication with the reservoir, for draining the collected water from the pump; and also preferably includes a sensor adapted to detect the presence of water in the reservoir.

The present invention also includes a cooking oil dispersement assembly mounted within the cooking tank which comprises an inlet manifold in fluid communication with the heat exchanger outlet tube and a dispersement tube in fluid communication with the inlet manifold. The dispersement tube is positioned approximate to, and has a portion extending along, a side wall of the cooking tank; and the portion of the dispersement tube extending along the cooking tank side wall has a plurality of orifices spaced longitudinally there along. These orifices are angled upwardly with respect to the cooking tank floor and inwardly towards the corresponding sidewall such that the cooking oil, ejected from the orifices, flows into the cooking tank in a rolling action upward and away from the sidewall.

Preferably, the cooking oil dispersement assembly also includes a second dispersement tube positioned in parallel to the first dispersement tube and in fluid communication with the inlet manifold. The second dispersement tube is positioned approximate to, and has a portion extending along, a second cooking tank side wall which oppositely faces the cooking tank side wall of the first dispersement tube. This portion of the second dispersement tube also includes a plurality of orifices spaced longitudinally there along which are angled upwardly with respect to the cooking tank floor and angled inwardly towards the second sidewall such that the cooking oil flows from this dispersement tube in a rolling action upward and away from this second sidewall. Therefore, the combination of the first and second dispersement tubes of the present invention provides a significantly enhanced heat distribution throughout the tank such that the food product is evenly and consistently cooked. The rolling action of the dispersement assembly also causes heavier food particles to be deposited in the point of the V-shaped cooking tank floor which has two downward sloping floor sections, each section sloping downward from a corresponding one of the first and second cooking tank sidewalls. Each of the dispersement tubes also preferably includes a slit at the truncated end of the dispersement tube for facilitating the discharge of food particles from the dispersement tubes.

The present invention also includes a removable cooking tank rack for supporting the frying baskets which is welded to a removable screen for substantially covering an outlet opening in the cooking tank. The rack is welded to the screen such that when an operator inserts the rack into the cooking tank for supporting the frying baskets the screen will automatically be installed in the cooking tank, and thereby will increase the life and performance of the fryer. Furthermore, a secondary screen which covers the outlet opening in the cooking tank is permanently attached thereto to prevent large food by-product particles from entering into the pump if the fryer is operated without the removable rack and screen assembly. This secondary screen also acts to block large food by-product particles which may occasionally get through the removable screen during normal operation of the fryer.

Accordingly, it is an object of the present invention to provide a recirculating food-product deep fryer which has increased efficiency, cooking performance and reliability. It is a further object of the present invention to provide a recirculating food-product deep fryer with a centrifugal, stand-pipe pump having increased performance and reliability. It is a further object of the present invention to provide a centrifugal stand-pipe pump for a food-product deep fryer in which the susceptibility of the pump motor to penetration with cooking oil is significantly reduced. It is a further object of the present invention to provide a centrifugal stand-pipe pump for a food-product fryer in which the susceptibility of a cooking oil vortex being formed in the sump tube of the pump is significantly reduced. It is a further object of the present invention to provide a bearing assembly for a centrifugal pump of a food product fryer which is less susceptible to clogging with food by-products and other solid particles. These and other objects and advantages of the present invention will be apparent from the following description, the accompanying drawings and the appended claims.

DETAILED DESCRIPTION

Figure 1:
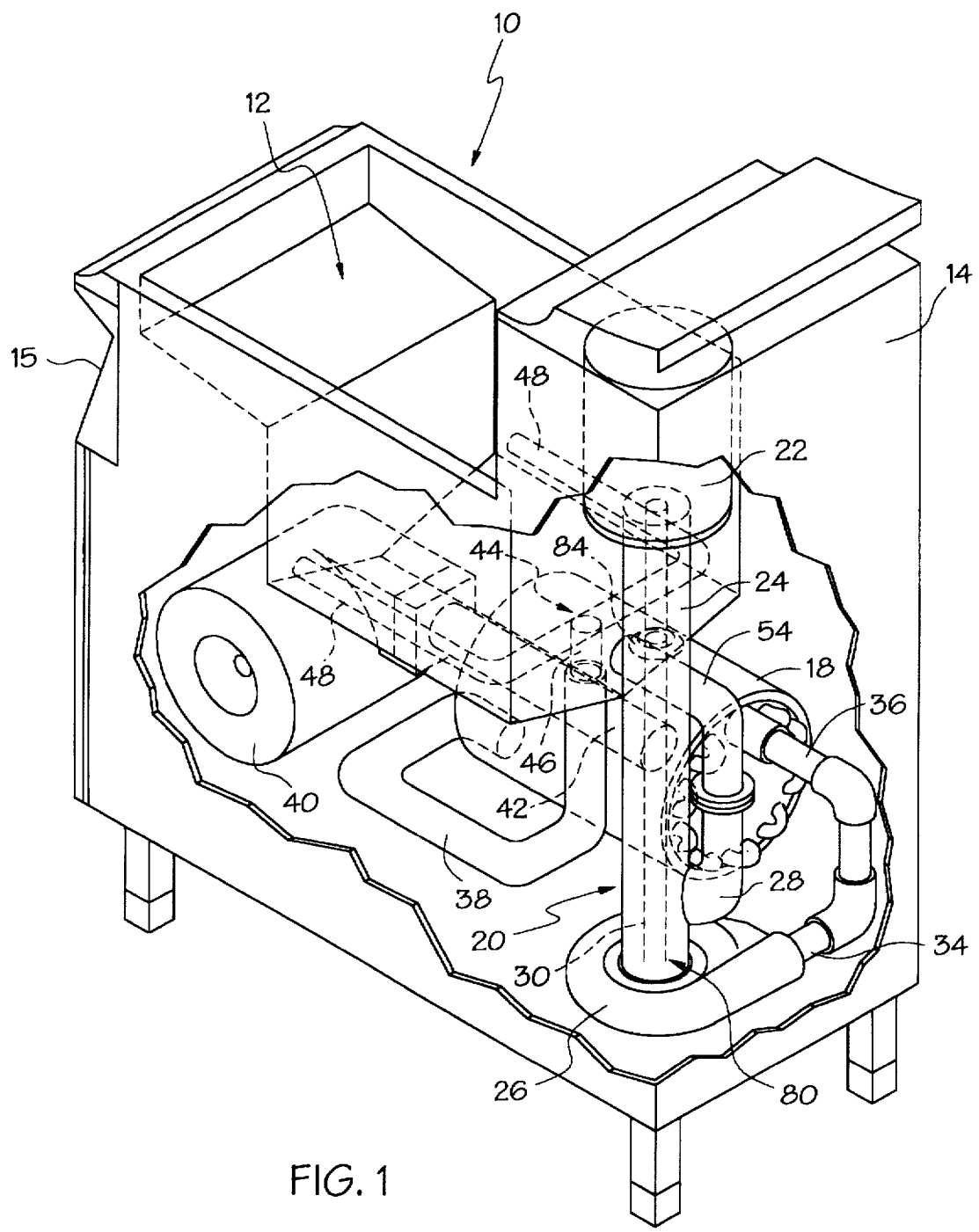
FIG. 1 is a perspective view of a recirculating deep fryer for use with the present invention.

As shown in FIG. 1, a recirculating, continuous-filtering deep fryer 10 includes a cooking tank 12 housed within an open-topped cabinet 14. The cabinet also includes a control panel 15, for the positioning of operator controls. The cooking tank 12 is adapted to hold cooking oil or other cooking liquids such as animal fat (all of which are hereinafter referred to as "cooking oil"). The cooking tank 12 is also adapted to receive wire baskets 16 (see FIG. 2) that a food-product held in the baskets 16 can be completely immersed in and cooked by the heated cooking oil. The cooking oil is caused to continuously circulate from the cooking tank 12, through a heat exchanger 18 and back into the cooking tank 12 by a stand-pipe centrifugal pump 20.

The pump 20 includes a motor 22, a vertical sump tube 24, an impeller (stator) housing 26, an inlet pipe 28, a rotor shaft 30, an impeller 32 (see FIGS. 5 and 7) and an outlet pipe 34.

The heat exchanger 18 is a cylindrical heat exchanger as is conventionally known in the art, having an inlet pipe 36 in fluid communication with the outlet pipe 34 of the centrifugal pump, and an outlet pipe 38. The heat exchanger also includes heating element or burner 42 positioned along its axis and supplied with fuel by a blower 40 positioned within the cabinet. The heat exchanger is designed such that the cooking oil travels through heat exchanger tubing within the heat exchanger 18. The internal heat exchanger tubing (not shown) is configured to permit the passage of the cooking oil back and forth across the burner 42 within the heat exchanger, and the internal tubing also includes fins for facilitating the absorption of heat from the burner 42.

The heated cooking oil is outlet from the heat exchanger 18 through the outlet pipe 38 at a constant predetermined temperature (which is usually around 350° F.). A conventional control system (not shown) operates in conjunction with a conventional temperature sensor (also not shown) mounted on the outside of the outlet pipe 38 to ensure that the cooking oil outlet from the heat exchanger 38 remains at the predetermined temperature.

As shown in FIGS. 1, 2, 3, 4 and 4A, the heated cooking oil is then injected into the cooking tank 12 by a cooking oil dispersement assembly 44. The dispersement assembly 44 comprises an inlet manifold 46 and two parallel L-shaped dispersement tubes 48 coupled to and in fluid communication with the inlet manifold 46. Each dispersement tube 48 has a longitudinal portion 51 which extends along a corresponding and oppositely facing side wall 52 of the cooking tank 12. Each portion 51 includes a plurality of dispersement orifices 50 for ejecting the heated cooking oil therefrom.

Figure 4:
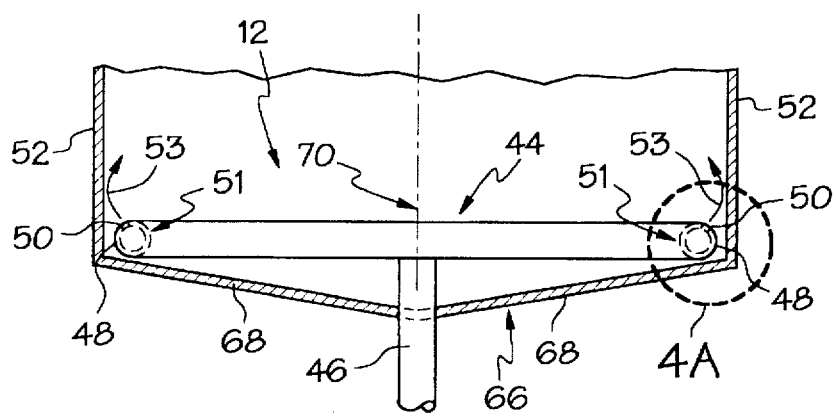
FIG. 4 is a cross-sectional view of the cooking tank and cooking oil dispersement assembly of the present invention, taken along lines 4—4 of FIG. 3.
Figure 4A:
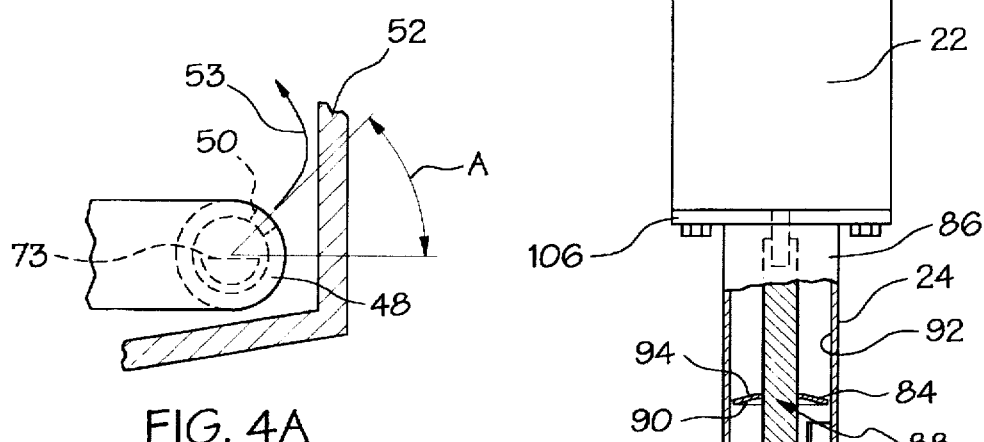
FIG. 4A is an enlarged view of a portion of the cooking oil dispersement assembly taken from the area of FIG. 4 bounded by the lines marked as 4A.

As shown in FIGS. 4 and 4A the dispersement orifices 50 in the dispersement tubes 48 point towards their respective cooking tank walls 52 and also point upwardly at an angle A such that the cooking oil ejects from the dispersement tubes 50 and deflects to off their respective walls 52 to a certain extent such that the flow of cooking oil exhibits a dual rolling action within the cooking tank 12 as shown by arrows 53. Preferably, the upward angle A is approximately 35°.

As is further shown in FIG. 4 the cooking tank 52 has a v-shaped bottom 66, having two downward sloping sections 68 which extend from the walls 52 adjacent to the dispersement tube portions 51. The downward sloping walls meet substantially at a center line 70 in the tank to form a point. The dual rolling flows of cooking oil will meet substantially at the center line 70 of the tank, and the dual rolling flows are pointed downward to a certain extent at this point. Therefore, this dual rolling flow of the cooking oil ejected from the dispersement tubes 50 tends to cause the larger food by-product particles to collect along the center line 70 of the tank, and to subsequently settle substantially along the point of the v-shaped floor 66 of the tank. Accordingly, this greatly simplifies the cleaning of the tank.

The dual rolling action of the cooking oil also significantly improves the heat distribution throughout the cooking oil bath within the tank and has been found to provide a heat distribution to an extent such that there is no more than a one degree difference of cooking oil temperature at any point within the cooking tank 12. The dual rolling action of the cooking oil also acts to cook the food products in a convection cooking manner, because the cooking oil is constantly flowing through the wire baskets 16 containing the food products.

It will be apparent to one of ordinary skill in the art, that while the present embodiment utilizes two parallel dispersement tubes 48 to generate a dual rolling flow of the cooking oil within the cooking tank 12, the use of a single dispersement tube to effectuate a single rolling flow of cooking oil, or the use of multiple dispersement tubes to effectuate multiple rolling flows of cooking oil are all within the scope of the present invention.

Furthermore, when cooking food-product items such as breaded chicken or fish, the breading on the chicken or cornmeal on the fish can tend to accumulate in the dispersement tubes Accordingly, a slit 73 (see FIG. 4A) is placed in each of the truncated ends 72 of the dispersement tubes 48 which allows these particles collecting within the dispersement tubes to be washed out of the tubes, thus preventing the dispersement tubes from being clogged with such food product particles. As is further shown if FIG. 4A, the slits 73 are preferably hemispherically shaped with the concave portions of the slits being substantially concentric with the circumference of the dispersement tubes, and are placed near the bottoms truncated ends 72 to allow the heavier food particles to be ejected therefrom.

The present configuration of the dispersement assembly 44 also allows for a more shallow cooking tank 12 than dispersement arrangements which have downward pointing orifices, because the downward pointing arrangements require space between the dispersement orifices and the bottom of the cooking tank to allow desired movement of the cooking oil through the tank.

Figure 2:
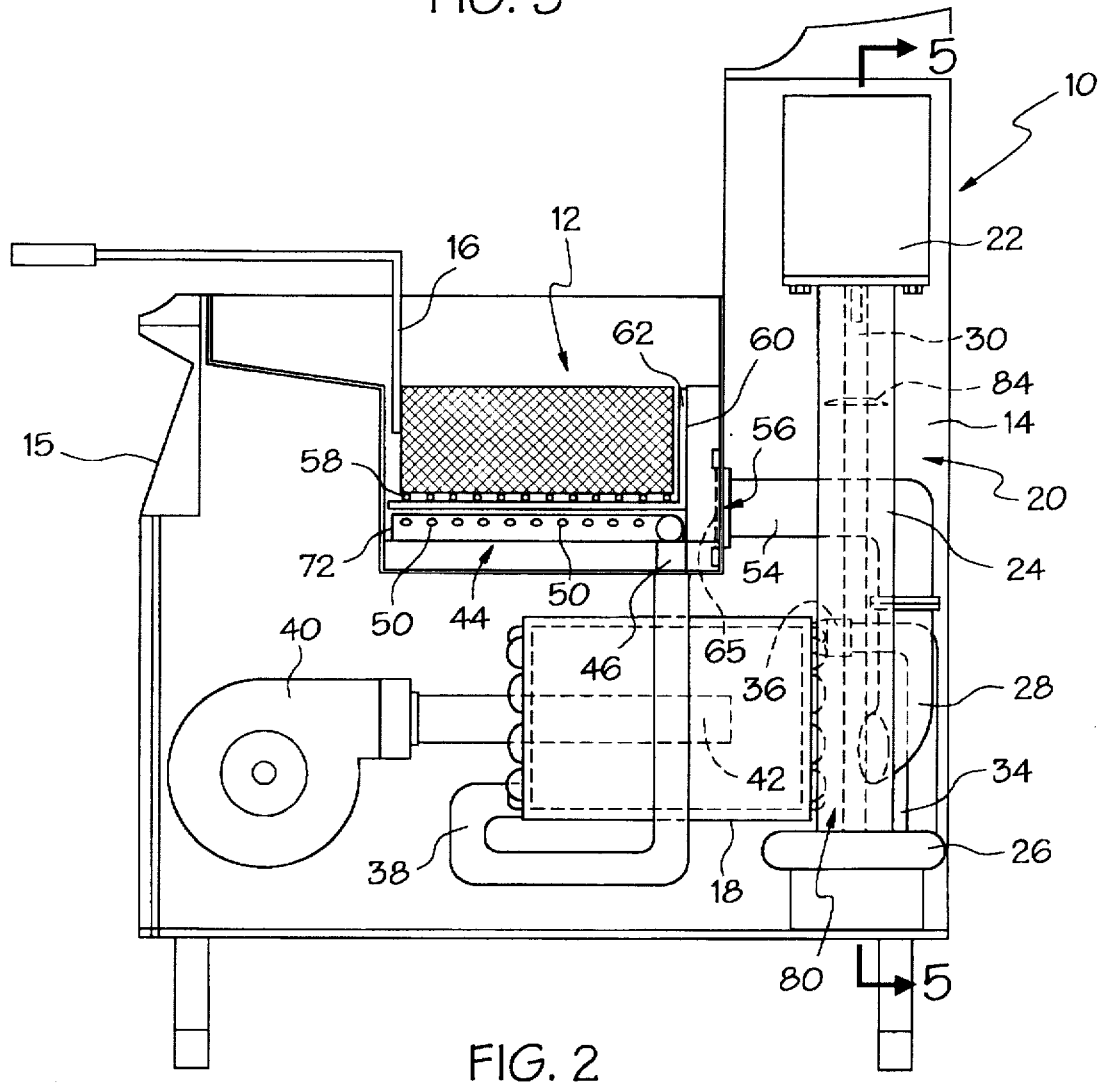
FIG. 2 is a cross-sectional side view of the fryer of the present invention.

As shown in FIGS. 1 and 2, from the cooking tank 12 the cooking oil is continuously pumped (or sucked) through an outlet pipe 54, having an outlet opening 56, by operation of the pump 20. The outlet pipe 5 4 of the cooking tank is in fluid communication with the inlet pipe 28 of the pump which is mounted to, and is in fluid communication with, the sump tube 24 near the bottom end 80 of the sump tube. Therefore, the cooking oil emerging from the cooking tank 12 is immediately fed into the centrifugal pump 20 through the inlet pipe 28 of the pump. Although the preferred embodiment of the fryer does not include a continuous-filtering mechanism, it may be desirable to incorporate a continuous-filtering system as is conventionally known in the art.

Figure 5:
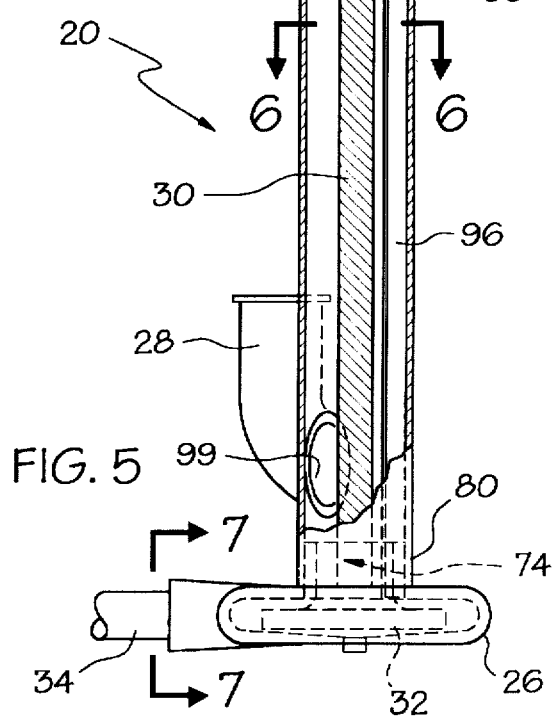
FIG. 5 is a cross-sectional view of the centrifugal pump assembly taken along lines 5—5 of FIG. 2.
Figure 7:
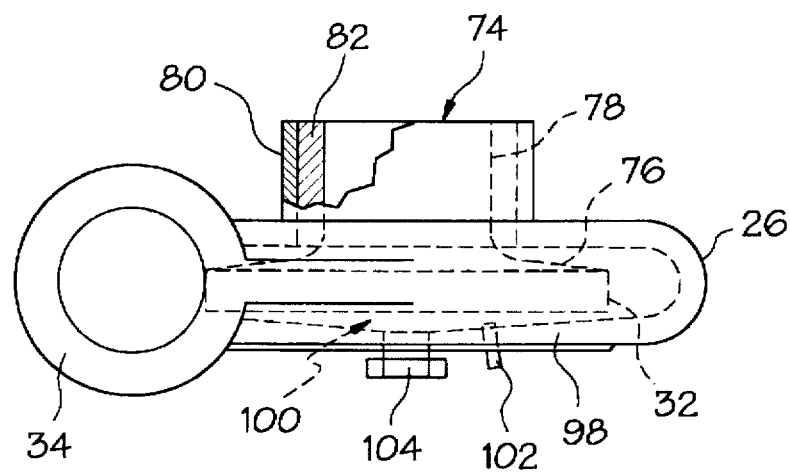
FIG. 7 is a cross-sectional view of the impeller housing, impeller, and impeller bearing assembly taken along lines 7—7 of FIG. 5.

As shown in FIGS. 5 and 7 the pump impeller 32 is coupled to the rotor shaft 30 substantially at the hub 74 of the impeller. Extending from the top surface 76 of the impeller is a hollow cylindrical bearing 78 which is journaled within the bottom end 80 of the sump tube 24 by an annular sleeve bearing 82. The top mounted bearing assembly 78, 82 significantly prevents the collection of food by-product or waste in the bearing components 78, 82. Furthermore, in a preferred embodiment the bearing 78 (and the entire impeller 32) is made from one type stainless steel material, while the sleeve bearing 82 is made from another type of stainless steel material having a different hardness value than that of the cylindrical bearing 78. The two different hardness values of stainless steel materials are used in the bearing components 78, 82 because two surfaces of a bearing should not be of the same material (i.e., one stainless steel material should be softer than the other). Alternatively, the sleeve bearing 82 may be made from cast-iron (the cast-iron having a different hardness value than the stainless steel material of the cylindrical bearing 78).

The cooking oil will enter the hub 74 of the impeller 32 through the hollow cylindrical bearing 78. The impeller contains a plurality of radially extending channels, formed by conventional impeller blades, (not shown) which provide fluid communication between the hub 74 and the circumferential perimeter of the impeller. During operation of the pump 20, the rotor shaft 30, and in turn the impeller 32 will rotate between 1600 and 3500 RPMs; and in the present embodiment, rotates at 3450 RPMs. This rotation of the impeller causes the cooking oil to be centrifugally forced radially outward from the hub 74 and into the impeller housing 26, from which the cooking oil is forced into the outlet pipe 34 tangentially coupled to the impeller housing 26, and is subsequently pumped to the inlet pipe 36 of the heat exchanger 18.

As shown in FIG. 7 the bottom surface 98 of the impeller housing 26 has a slight concavity which forms a reservoir 100 below the impeller 32. Because water is heavier than oil, any water entrained in the cooking oil and not released as steam will tend to gather in this reservoir 100. Accordingly, a sensor 102 is provided to detect the presence of water within the reservoir 100, and a valve 104 is provided at the lowest point of the reservoir to drain off any water detected by the sensor 102.

As shown in FIG. 5, the rotor shaft 30 includes a frustoconical, annular baffle plate 84 bolted or welded (or otherwise fixedly attached) thereon, where the rotor shaft 30 extends through the hub 88 of the baffle plate. The baffle plate 84 is preferably positioned near the top end 86 of the shaft. The annular baffle plate 84, during operation of the pump, acts to centrifugally sling cooking oil particles entrained in steam which is rising vertically through the sump tube 24 and coming into contact the bottom surface 90 of the baffle plate 84. These cooking oil particles are thus caused to impinge against the inner surface 92 of the sump tube 24, where they gather and subsequently drip downwardly again towards the bottom end 80 of the sump tube.

The downward sloping top surface 94 of the baffle plate 84 is provided such that any cooking oil particles ending up thereon will be allowed to drip downwardly again towards the bottom end 80 of the sump tube.

Preferably, the clearance between the outer circumference of the baffle plate 84 and the inner surface 92 of the sump tube is any clearance less than one-sixteenth of an inch; while in the present embodiment, the clearance between the outer circumference of the baffle plate 84 and the inner surface 92 of the sump tube is approximately one-thirtysecond of an inch. Accordingly, the difference in diameters between the outer circumference of the baffle plate 84 and the circumference of the inner surface 92 of the sump tube is preferably less than one-eighth of an inch; while in the present embodiment, the difference in diameters is approximately one-sixteenth of an inch.

While the annular baffle plate 84 is preferably a frustoconically shaped plate, it will be apparent to one of ordinary skill in the art that any sort of annular baffle fixedly coupled to the rotor shaft 30 in which cooking oil particles entrained in rising steam, will impinge against, and will be thus centrifugally slung therefrom, will fall within the scope of the invention.

The vertical position of the baffle plate 84 on the rotor shaft 30 is preferably at a point above where the normal level of cooking oil resides in the sump tube 24 during normal operation of the pump 20. Furthermore, it has been found that positioning the baffle plate 84 three inches below the motor mount 106 provides the adequate results.

Figure 6:
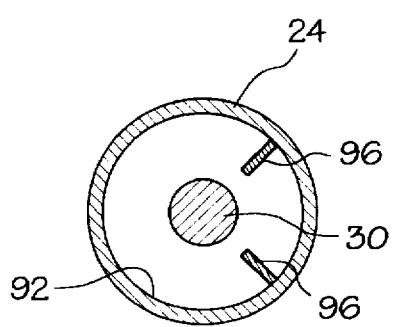
FIG. 6 is a cross-sectional view of the shaft pipe, vertical baffles, and shaft of the centrifugal pump taken along lines 6—6 of FIG. 5.

As shown in FIGS. 5 and 6 the vertical sump tube 24 of the pump also includes two vertical baffle plates 96 mounted to the inner surface 92 of the sump tube 24 and extending radially inward towards the rotor shaft 30. Preferably, the vertical baffle plates 96 extend vertically from the impeller 32 to at least to the normal cooking oil level in the sump tube 24. The vertical baffle plates 96 act to substantially eliminate any formation of a vortex within the cooking oil present in the sump tube 24 during operation of the pump 20. Furthermore, although two baffle plates 96 are used in the preferred embodiment, is within the scope of the invention to utilize a plurality of such baffle plates 96, circumferencially spaced along the inner surface 92 of the sump tube, or to even use one of the vertical baffle plates 96. Also, it is preferred that the height of the vertical baffle plates 96 are approximately three times the diameter of the opening 98 of the inlet pipe 28 to the pump.

It is also preferred that any pump component not totally immersed in cooking oil is to be made from stainless steel. Therefore, the sump tube 24, the rotor shaft 30, the motor mount 106, the annular baffle plate 84 and the vertical baffle plates 96 are all constructed from stainless steel. The use of stainless steel components in the pump 20 not only prohibits rusting and other undesirable deterioration of the components to occur, it has also been found that the food waste particles carried in the cooking oil tends not to stick to stainless steel components.

Figure 3:
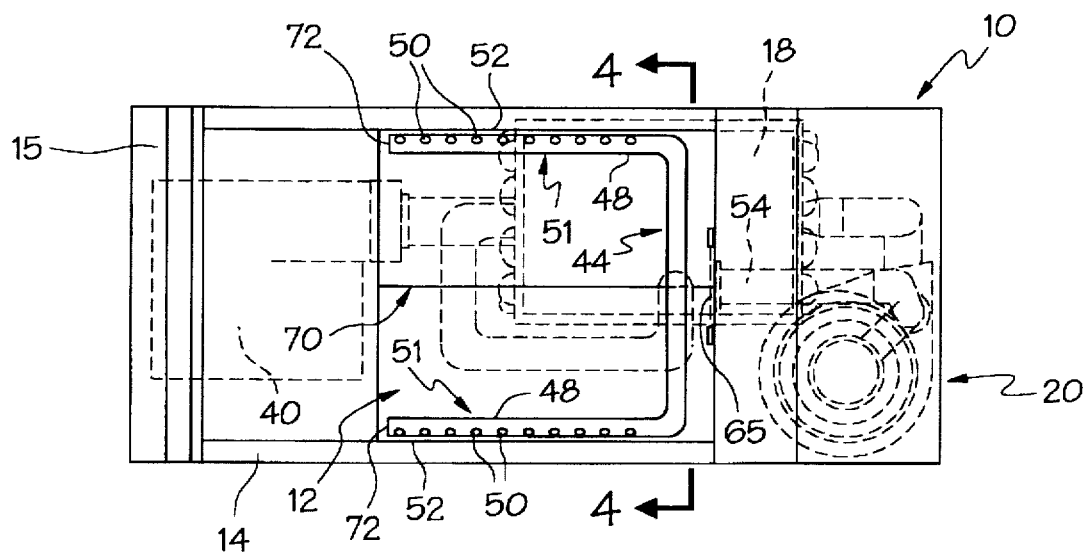
FIG. 3 is a top view of a fryer of the present invention.
Figure 8:
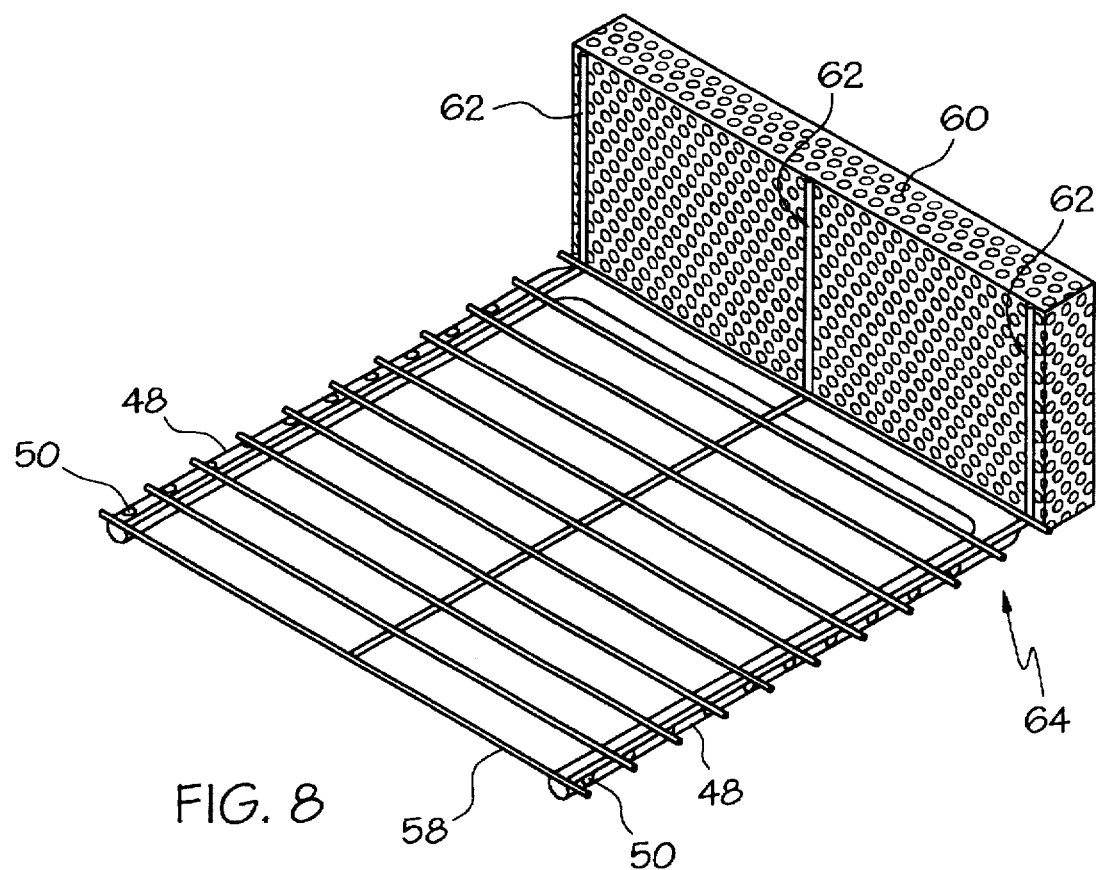
FIG. 8 is a perspective view of the cooking tank rack and screen assembly for use with the present invention.

As shown FIGS. 2 and 8 the cooking tank 12 also includes a removable rack 58 and a removable screen 60. The rack 58 is removably mounted within the cooking tank 12 to provide support for the wire baskets 16 above the dispersement assembly 44 within the tank 12. The screen 60 is positioned to substantially cover the outlet pipe opening 56, and thus prohibits large food and food by-product particles from entering the outlet pipe 54, and in turn the centrifugal pump 20. The rack 58 and screen 60 are perpendicularly oriented, and the rack 58 has several perpendicularly extending posts 62 in which the screen 60 is welded thereto. Accordingly the rack and screen 58, 60 are permanently attached to form a single rack and screen assembly 64, such that when the rack is inserted into the cooking tank 12, the screen 60 is simultaneously mounted into position As shown in FIGS. 2 and 3, a secondary screen 65 is permanently attached to the interior of the cooking tank 12 such that it completely covers the outlet opening 56 and prevents large food by-product particles from entering into the pump 20 if the fryer 10 is operated without the removable rack and screen assembly 64. This secondary screen 65 also acts to block large food by-product particles which may occasionally get through the removable screen 60 during normal operation of the fryer Having described the invention in detail and by reference to the drawings, it will be apparent that modifications and variations on the preferred embodiment are possible without departing from the scope of the invention as defined in the following claims.

What is claimed is:

1. A centrifugal pump for pumping a hydrophobic fluid or fluids comprising:
    a cylindrical, hollow and vertically aligned sump tube having a top end, a bottom end, an inner surface and an axis;
    a pump impeller rotatably mounted approximate said bottom end of said sump tube, said pump impeller having a top surface, a bottom surface and a hub;
    a rotor shaft extending through said sump tube substantially along said sump tube axis and coupled to said pump impeller hub, for rotatably driving said pump impeller;
    a pump inlet;
    a pump outlet;
    a motor coupled to said rotor shaft approximate said top end of said sump tube for rotatably driving said rotor shaft; and an annular baffle having a hub, a top surface and a bottom surface, mounted to said rotor shaft between said pump impeller and said motor, said rotor shaft extending through said annular baffle hub;
    whereby said annular baffle acts to centrifugally sling hydrophobic fluid particles entrained in steam rising vertically through said sump tube and coming into contact with said bottom surface of said annular baffle such that the hydrophobic fluid particles are caused to impinge against said inner surface of said sump tube and drip downwardly towards said bottom end of said sump tube.

2. The centrifugal pump of claim 1, wherein:
    the pump operates with an amount of the hydrophobic fluid present in said sump tube, and the hydrophobic fluid in said sump tube normally rises only to a predetermined level within said sump tube; and
    said annular baffle is mounted to said rotor shaft above said level.

3. The centrifugal pump of claim 2, wherein said top surface of said annular baffle slopes downwardly with the radial distance from said rotor shaft.

4. The centrifugal pump of claim 3, wherein said annular baffle has a frustoconically shaped top surface.

5. The centrifugal pump of claim 4, wherein said annular baffle is a frustoconically shaped annular plate.

6. The centrifugal pump of claim 2, wherein:
    said annular baffle has an outer perimeter with a first diameter; and
    said inner surface of said sump tube has a second diameter slightly larger than said first diameter.

7. The centrifugal pump of claim 2, wherein said annular baffle is positioned approximate said top end of said sump tube.

8. The centrifugal pump of claim 2, wherein:
    said top surface of said annular baffle slopes downwardly with the radial distance from said rotor shaft;
    said annular baffle has an outer perimeter with a first diameter;
    said inner surface of said sump tube has a second diameter slightly larger than said first diameter; and
    said annular baffle is positioned approximate said top end of said sump tube.

9. The centrifugal pump of claim 8, wherein said annular baffle is a frustoconically shaped plate.

10. The centrifugal pump of claim 1, further comprising:
    a vertically aligned second baffle mounted to said inner surface of said sump tube, between said annular baffle and said impeller, and extending radially inward towards said rotor shaft;
    whereby said second baffle substantially prevents the formation of a vortex in the hydrophobic fluids present within said sump tube during operation of the pump.

11. The centrifugal pump of claim 10, wherein said second baffle is a substantially flat plate extending radially inward from said inner surface of said sump tube.

12. The centrifugal pump of claim 11, further comprising a plurality of said second baffles circumferentially spaced along said inner surface of said sump tube.

13. The centrifugal pump of claim 10, wherein:
    the pump operates with an amount of the hydrophobic fluid present in said sump tube, and the hydrophobic fluid in said sump tube normally rises only to a predetermined level within said sump tube;
    said annular baffle is mounted to said rotor shaft above said level; and
    said second baffle extends vertically from a point approximate to said bottom end of said sump tube to at least a point approximate to said level.

14. A recirculating food product fryer comprising:
    a cooking tank having an interior, a plurality of side walls and a floor;
    a dispersement assembly extending into said tank interior, for emitting cooking oil into said tank interior;
    an outlet tube in fluid communication with said tank interior and having an opening into said tank interior;
    a heat exchanger having an outlet in fluid communication with said dispersement assembly and an inlet; and
    a centrifugal pump for pumping said cooking oil, said pump including:
        a cylindrical, hollow and vertically aligned sump tube having a top end, a bottom end, an inner surface and an axis;
        a pump impeller rotatably mounted approximate said bottom end of said sump tube, said pump impeller having a top surface, a bottom surface and a hub;

a rotor shaft extending through said sump tube substantially along said sump tube axis and coupled to said pump impeller hub, for rotatably driving said pump impeller;

a pump inlet in fluid communication with said outlet tube of said cooking tank;

a pump outlet in fluid communication with inlet of said heat exchanger;

a motor coupled to said rotor shaft approximate said top end of said sump tube for rotatably driving said rotor shaft; and an annular baffle having a hub, a top surface and a bottom surface, mounted to said rotor shaft between said pump impeller and said motor, said rotor shaft extending through said annular baffle hub;

whereby said annular baffle acts to centrifugally sling cooking oil particles entrained in steam rising vertically through said sump tube and coming into contact with said bottom surface of said annular baffle such that the cooking oil particles are caused to impinge against said inner surface of said sump tube and drip downwardly towards said bottom end of said sump tube.

15. The recirculating food product fryer of claim 14, wherein:

said pump operates with an amount of said cooking oil present in said sump tube, and said cooking oil in said sump tube normally rises only to a predetermined level within said sump tube; and said annular baffle is mounted to said rotor shaft above said level.

16. The recirculating food product fryer of claim 15, wherein said top surface of said annular baffle slopes downwardly with the radial distance from said rotor shaft.

17. The recirculating food product fryer of claim 16, wherein said annular baffle has a frustoconically shaped top surface.

18. The recirculating food product fryer of claim 17, wherein said annular baffle is a frustoconically shaped annular plate.

19. The recirculating food product fryer of claim 15, wherein said annular baffle has an outer perimeter with a first diameter; and said inner surface of said sump tube has a second diameter slightly larger than said first diameter.

20. The recirculating food product fryer of claim 19, wherein:

said second diameter is no more than one-eighth of an inch larger than said first diameter.

21. The recirculating food product fryer of claim 20, wherein: said annular baffle is a frustoconically shaped plate, and said plate slopes downwardly with the distance from said rotor shaft.

22. The recirculating food product fryer of claim 15, wherein said annular baffle is positioned approximate said top end of said sump tube.

23. The recirculating food product fryer of claim 15, wherein said annular baffle, said rotor shaft, and said sump tube are made from stainless steel.

24. The recirculating food product fryer of claim 15, wherein:

said top surface of said annular baffle slopes downwardly with the radial distance from said rotor shaft;

said annular baffle has an outer perimeter with a first diameter;

said inner surface of said sump tube has a second diameter slightly larger than said first diameter; and said annular baffle is positioned approximate said top end of said sump tube.

25. The recirculating food product fryer of claim 24, wherein said annular baffle is a frustoconically shaped plate.

26. The recirculating food product fryer of claim 25, wherein said second diameter is no more than one-eighth of an inch larger than said first diameter.

27. The recirculating food product fryer of claim 26, wherein said annular baffle, said rotor shaft, and said sump tube are made from stainless steel.

28. The recirculating food product fryer of claim 14, wherein said centrifugal pump further includes:

a vertically aligned second baffle mounted to said inner surface of said sump tube, between said annular baffle and said impeller, and extending radially inward towards said rotor shaft;

whereby said second baffle substantially prevents the formation of a vortex in said cooking oil present within said sump tube during operation of the pump.

29. The recirculating food product fryer of claim 28, wherein said second baffle is a substantially flat plate extending radially inward from said inner surface of said sump tube.

30. The recirculating food product fryer of claim 29, further comprising a plurality of said second baffles circumferentially spaced along said inner surface of said sump tube.

31. The recirculating food product fryer of claim 28, wherein:

the pump operates with an amount said cooking oil present in said sump tube, and said cooking oil in said sump tube normally rises only to a predetermined level within said sump tube;

said annular baffle is mounted to said rotor shaft above said level; and said second baffle extends vertically from a point approximate to said bottom end of said sump tube to at least a point approximate to said level.

32. The recirculating food product fryer of claim 28, wherein:

said inlet has an inlet diameter; and said second baffle has a vertical height approximately equal to three times said inlet diameter.

33. The recirculating food product fryer of claim 28, wherein said annular baffle, said second baffle, said rotor shaft, and said sump tube are made from stainless steel.

* * * * *

UNITED STATES PATENT AND TRADEMARK OFFICE
CERTIFICATE OF CORRECTION

PATENT NO. : 5,680,811
DATED : October 28, 1997
INVENTOR(S) : David Highnote et al.

It is certified that error appears in the above-identified patent and that said Letters Patent is hereby corrected as shown below:

On the title page item

[57] Abstract, line 3, replace "cooing" with --cooking--, and at line 11, replace "couple" with --coupled--.

Column 11, claim 19, line 42, after "wherein" add --:--.

Column 11, claim 21, line 53, after "wherein" delete --:--.

Signed and Sealed this

Thirty-first Day of March, 1998

Attest:

BRUCE LEHMAN

Attesting Officer    Commissioner of Patents and Trademarks